Jan. 6, 1925.

O. L. JONES

Re. 15,976

PORTABLE TURNTABLE

Original Filed April 24, 1920

2 Sheets-Sheet 1

Oscar L. Jones

INVENTOR.

BY

Edwin P. Coates

ATTORNEY.

Jan. 6, 1925.

Re. 15,976

O. L. JONES

PORTABLE TURNTABLE

Original Filed April 24, 1920 2 Sheets-Sheet 2

Oscar L. Jones

INVENTOR.

BY

Edwin P. Corbett

ATTORNEY.

Reissued Jan. 6, 1925.

Re. 15,976

UNITED STATES PATENT OFFICE.

OSCAR L. JONES, OF PENNVILLE, INDIANA.

PORTABLE TURNTABLE.

Original No. 1,358,748, dated November 16, 1920, Serial No. 376,228, filed April 24, 1920. Application for reissue filed November 13, 1922. Serial No. 600,694.

*To all whom it may concern:*

Be it known that I, OSCAR L. JONES, a citizen of the United States of America, and residing at Pennville, in the county of Jay and State of Indiana, have invented certain new and useful Improvements in Portable Turntables, of which the following is a specification.

This invention relates to a portable turntable which is particularly adapted for use by street, highway and building contractors. Heretofore, in the accomplishment of the above class of work—the carting away of the excavation and the hauling of the building material—where usually there exists insufficient space for turning the wagon or truck around either before receiving the load or after discharging the material hauled in, much time is lost and annoyance caused by the necessity of backing the vehicle to a point where there is sufficient room to enable the vehicle to be turned around. In the case of building a street, and especially in building highways in the country, wagons and trucks must ofttimes be backed a distance amounting to as much as a quarter of a mile before reaching a cross driveway or lane where there is sufficient space in which to turn the vehicle, so that much delay and congestion of traffic, with much loss of time and with a corresponding increase in expense and operation results.

One of the objects of the present invention is to provide a portable turntable which can easily and conveniently be moved along as the work of excavating the street or highway progresses, and likewise may be moved along in bringing in the building material as the construction of the road or highway progresses. The present turntable is particularly advantageous to building contractors during the erection of buildings in cities where ground space is usually limited, and where considerable dirt must be excavated and removed, and the hauling in of different kinds of building material as the construction of the building progresses.

A further object of the invention consists in the provision of a turntable of the above character wherein the mechanism for rotating the turntable is set into operation through the power derived from the traction wheels of a motor truck without requiring the operator to dismount.

There are other objects of the invention which will appear from a perusal of the following description and claims, and which are attained by means of the construction illustrated in the accompanying drawings, forming a part hereof, in which—

Figure 1:
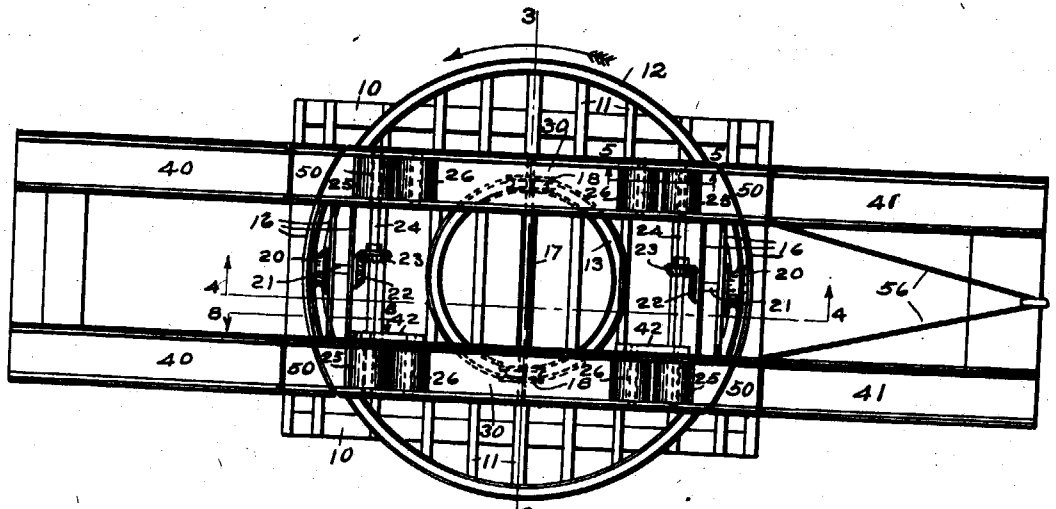
Figure 1 is a top or plan view of my improved portable turntable.
Figure 2:
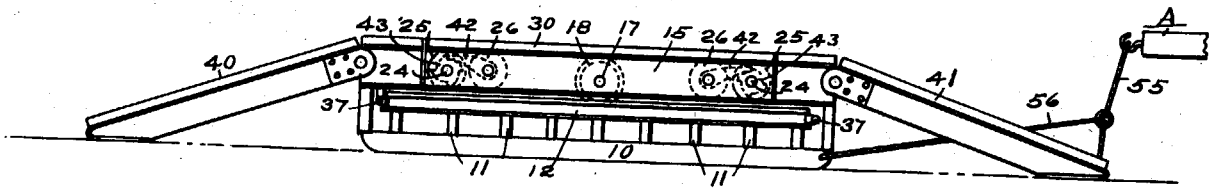
Figure 2 is a side elevation of the construction shown in Figure 1.
Figure 3:
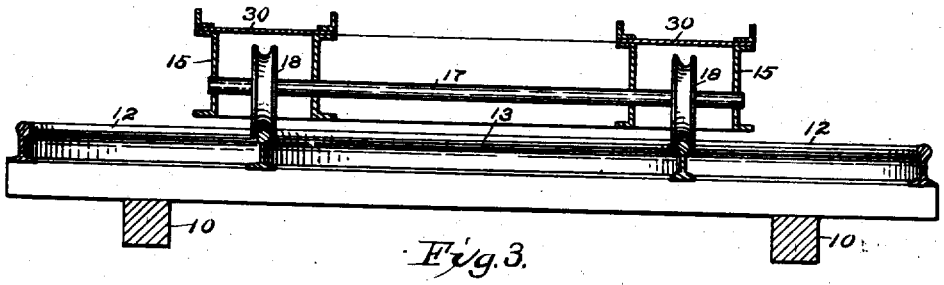
Figure 3 is a cross section on the line 3—3 in Figure 1.

Referring to the drawings, the turntable is suitably arranged to operate upon an under structure of skid-frame consisting of a pair of runners 10 which are connected together at intervals by means of the cross beams or sleepers 11. Arranged upon sleepers 11 is the circular track comprising a pair of concentrically arranged rails, of which rail 12 forms the outer portion of the track and the rail 13 the inner portion thereof.

The turntable comprises a pair of parallel beams 15 which are preferably made of angle iron which may be suitably connected together at their ends by the cross beams 16 to form a rigid structure, and passing transversely through the central portions of the beams 15 is an axle 17 which is provided near each end with a grooved wheel 18, the latter moving along the inner rail 13 and forming a transverse support for the turntable. The turntable is supported longitudinally and at right angles to the plane of wheels 18 by means of the wheels 20 which are mounted upon shafts 21. The inner end of each shaft 21 is provided with a keyed bevel pinion 22, these latter pinions meshing with corresponding pinions 23 which are keyed to shafts 24, the latter shafts having their bearings in the beams 15. Each end of each of the shafts 24 is provided with a fixed drum 25 through which movement of rotation is inparted by the traction wheels of the truck to cause wheels 20 to roll along rail 12 and automatically rotate the turntable for turning the truck or other vehicle around. Arranged parallel to each drum 25 is an idler drum 26, and the recess formed between the convex surfaces of each pair of drums provides a depression for defining the operative positions of the traction wheels of the motor car when transmitting power in rotating a pair of drums 25 secured to one of the shafts 24, for imparting movement of rotation to the turntable. Arranged intermediate the drums 26 is a pair of parallel channel irons 30 which form a track over which the wheels of the wagon or truck roll, when moving upon or off of the turntable.

Figure 4:
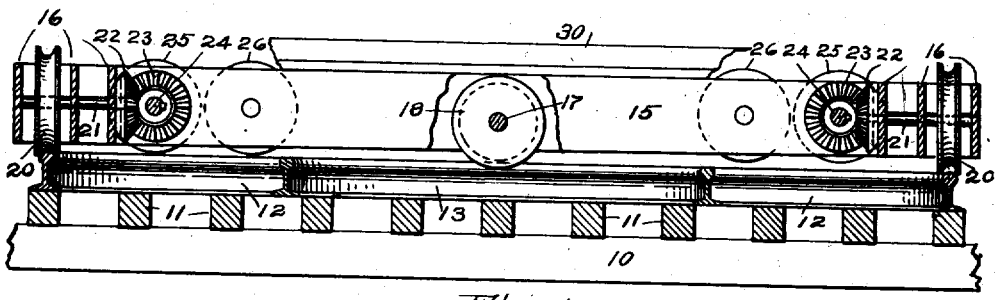
Figure 4 is a longitudinal sectional view on the line 4—4 in Figure 1, the inclines to the turntable being omitted.
Figure 5:
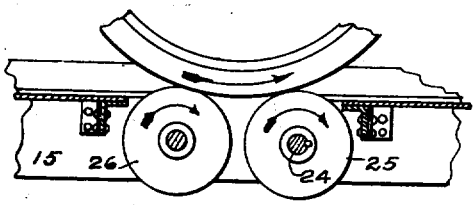
Figure 5 is an enlarged detail sectional view on the line 5—5 in Figure 1.
Figure 6:
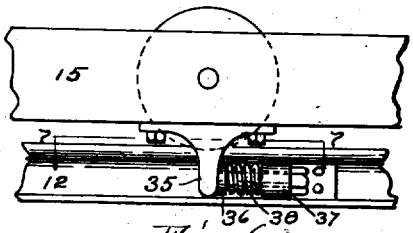
Figure 6 is a fragmentary detail view in side elevation of the resilient stop device
Figure 8:
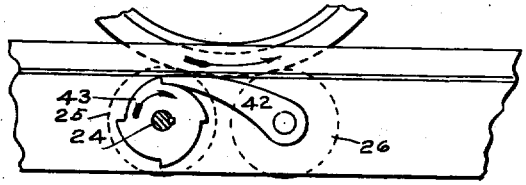
Figure 8 is a fragmentary detail view in elevation from the line 8—8 in Figure 1.
Figure 7:
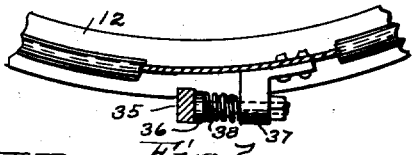
Figure 7 is a view partially in elevation and partially in section, on the line 7—7 in Figure 6.

It will be noted in examining Figure 4 that the turntable is balanced upon shaft 17 and wheels 18 so that when a wagon or truck is in position to cause the turntable to be rotated, wheel 20 adjacent the traction wheels of the motor truck alone will be in contact with rail 12, while the remaining wheel 20 on the opposite side of the turntable will be elevated free from rail 12. This arrangement removes any opposition to the normal movement of the turntable, which would result if both wheels 20 were simultaneously in contact with rail 12. When the turntable has moved a sufficient distance—180 degrees—to completely turn the wagon or truck around further movement of the turntable is prevented by means of a fixed post 35, secured to the edge of the turntable coming into contact with a pair of stops 36 which are arranged a sufficient distance apart on the outer surface of rail 12 to permit the turntable to alternately move 180 degrees. As shown in Figure 6 the stops 36 comprise large headed bolts which slide loosely through bosses 37 secured to rail 12. Springs 38 are inserted between the heads and bosses 37 to form a cushion for modifying the effect of the impact of the parts when the turntable reaches the end of its rotary travel. When the truck has been completely turned around to the point where further movement is arrested, by means of a resilient stop 36, the operator immediately reverses the direction of movement of the traction wheels of the truck, the latter moving backward off of the drums 25 and down incline 40 to a point where it is desired to dump or receive a load. At this time when the direction of movement of the traction wheels of the motor truck is in reverse to back off of the turntable, drums 25 are held against a reverse movement of rotational travel by means of a pawl 42 engaging a ratchet wheel 43 mounted on shaft 24. At the end of the operation of dumping the load or receiving a load the movement is reversed to again move the truck up incline 40. With a little practice the operator can so increase the speed of the motor truck in climbing incline 40 to secure the necessary degree of momentum to cause the traction wheels to roll idly over the adjacent drums 25 without imparting movement of rotation to the latter, thereby holding the turntable against further movement. When the traction wheels have passed over drums 25, adjacent to incline 40, the operator may then shift his gear mechanism so as to positively drive the truck from the turntable, for the reason that the drums 25 adjacent to incline 41 are not affected by the contact of the traction wheels, the latter being positively held against rotation at this time by means of hereinbefore described pawl 42 and ratchet wheel 43. The turntable now being free of the truck is left in proper position for receiving the next oncoming truck. The succeeding truck mounts incline 41 and moves forward on the turntable, in the manner as heretofore described, until the power wheels rest within the recesses formed by the opposing convex surfaces of the drums 25 and 26 so that continued rotation of the traction wheels imparts the necessary movement and direction of rotation to the drums 25, for moving the turntable around. It will be noted that the turntable during each period of operation moves but one-half of its circumference—180 degrees—and that such movements are not in the same direction but alternate, first in one direction and then in a reverse direction. I prefer to impart an oscillatory instead of an intermittent forward movement to the turntable for the reason that I can more easily arrange the heretofore described stop devices for bringing the turntable to a state of rest in determined positions.

It will be noted that the opposite ends of the under structure are provided with stationary platform sections which are covered with floors 50 the surface planes of which are in line with the surface plane of the movable portion of the turntable. The floor sections 50 form the approaches for the rotating turntable and enable close fitting joints to be formed between their adjacent edges and the movable turntable. These fixed sections of the platform also provide the means for pivotally mounting the incline approaches 40 and 41.

While I have shown the portable turntable mounted on the sled runners 10, which construction I deem most desirable for the reason that a firmer base can be secured than by mounting the under structure on wheels, I have no desire to limit myself to the use of sled runners. The portable character and convenience of the present invention is apparent when taking into consideration its use in connection with specific kinds of work heretofore enumerated, and to enable the structure to be readily moved, I provide a particular kind of a hitch which consists of a rope or chain 55 extending from the free end of incline 41 and may be attached to a hook or other fastening device mounted on the end of a wagon or truck body A. Intermediate the ends of the rope or chain 55 I attach a second rope or chain 56 which extends to and connects with the adjacent ends of the runners 10 of the turntable structure. By means of this attachment, when the wagon or truck A moves forward, the first action of forward movement, operating through rope or chain 55, elevates the free end of the incline 41 above the surface of the ground, after which the line of draft is transferred to the rope or chain 56 extending to runners 10 for moving forward the entire turntable structure over the surface of the ground.

The operation of the apparatus is as follows: The motor truck moves up incline 41 and upon the movable portion of the turntable until the rear traction wheels of the truck occupy the recesses formed by the convex surfaces of the adjacent drums 25 and 26, and through the continued rotation of the traction wheels movement of rotation is imparted to drums 25 in a direction as indicated by the arrow on one of the drums 26 (Figure 1). Drums 25 are keyed to shaft 24, and the latter operating through bevel pinions 22 and 23 cause grooved wheel 20 which is in contact with rail 12 to roll along the latter and move the turntable in the direction indicated by the arrow at the top of Figure 1. When the turntable has moved a distance equaling one-half of its circumference, 180 degrees, fixed post 35 comes in contact with one of the resilient stops 36 whereby further movement of the turntable is arrested, the turntable being in position to permit the driver to back off of the turntable and down incline 40 to the point of either receiving or dumping a load. To permit the truck to back off of the turntable necessitates a reversal of movement of the traction wheels, and when this reverse movement takes place drums 25 are held against movement of rotation by means of the pawl 42 and ratchet wheel 43 to permit the traction wheels to easily roll clear of said drum. When the operator starts forward after dumping or receiving a load he moves up incline 40 with sufficient speed so that he is able to throw his power transmission mechanism out of gear and permit the momentum of the truck to carry the latter idly over the adjacent drums 25 without imparting movement of rotation to drums 25 and the movable turntable. After the traction wheels pass over drums 25 adjacent to incline 40, the operator is free to throw in his gear mechanism for applying power to the traction wheels for positively driving the truck from the turntable, for the reason that the drums 25 located adjacently to incline 41 are held to resist the action of the traction wheels at this time by means of the pawl 42 and ratchet wheel 43. When the truck is clear of the turntable the latter is in position to receive the next oncoming truck. The next truck travels up incline 41 and upon the turntable with the traction wheels occupying the recesses between the adjacent drums 25 and 26, the drums 25 referred to are at this time occupying a position at the left hand end of the turntable in Figure 1. Under the continued movement of the traction wheels of the truck shaft 22 the pinions 23 and 24 are rotated to rotate grooved wheel 20 in a direction to rotate the turntable in the opposite direction from that indicated by the arrow at the top of Figure 1. This reversal of movement of the turntable is secured by placing the beveled gears 23 on the same side of beveled pinions 22, as clearly indicated in Figure 1.

Having thus fully described my invention, what I desire to secure by Letters Patent is—

1. A turntable of the character described, driving means arranged near the opposite sides for rotating the turntable in opposite directions, and means for tilting said turntable and effecting the disengagement of all but one of said driving means.

2. A turntable of the character described, driving means arranged near the opposite sides for rotating the turntable in opposite directions, and means for tilting the turntable and moving out of operative position all but one of said driving means.

3. A turntable of the character described, driving means actuated by the vehicle wheels for alternately rotating the turntable in opposite directions, and means for tilting the turntable and disengaging and throwing out of operation all but one of said driving means.

4. A turntable of the character described, driving means actuated by rotation of the vehicle wheels for alternately rotating the turntable in opposite directions, means for tilting and throwing out of operation all but one of said driving means, and means for mounting and rendering said turntable portable.

5. A turntable of the character described, driving means actuated by rotation of the vehicle wheels for alternately rotating the turntable in opposite directions, means for tilting the turntable and throwing out of operation all but one of said driving means, and means for arresting the rotational travel of the turntable in determined positions.

6. A turntable of the character described, driving means actuated by rotation of the vehicle wheels for alternately rotating the turntable in opposite directions, means for tilting the turntable and throwing out of operation all but one of said drawing means, means for arresting the rotational travel of the turntable in determined positions and means for resiliently checking and completely arresting the rotary movement of the turntable in determined positions.

7. A turntable comprising driving means operated by the wheels of a vehicle for rotating the turntable and means for tilting said turntable to render said driving means operative.

8. A turntable comprising driving means arranged near the opposite sides for rotating the turntable in opposite directions and means for effecting the disengagement of all but one of said driving means.

9. A turntable comprising driving means arranged near the opposite sides for rotating the turntable and means for tilting said turntable and effecting the disengagement of all but one of said means.

10. A turntable comprising driving means arranged near the opposite sides for rotating the turntable and means for tilting said turntable for rendering one of said driving means operative.

11. A turntable comprising driving means arranged near the opposite sides for rotating the turntable and means for tilting said turntable for rendering one of said driving means inoperative.

12. A turntable comprising driving means actuated by a vehicle for rotating the turntable in opposite directions and means operative by the weight of the vehicle for rendering one of said driving means inoperative.

13. A turntable comprising driving means actuated by a vehicle for rotating the turntable in opposite directions and means operative by the weight of the vehicle for effecting disengagement of one of said driving means.

14. A turntable comprising driving means for rotating the turntable and means for tilting the turntable to render one of said driving means operative.

15. A turntable comprising driving means arranged near the opposite sides for rotating the turntable and means for tilting the turntable to render said driving means operative to rotate the turntable.

16. A turntable comprising a rotatable table, and driving means actuated by the vehicle for rotating the table, said table being so mounted that the weight of the vehicle will be shifted towards said driving means.

17. A turntable comprising a track, driving means actuated by the wheels of a vehicle and engageable with the track for rotating the turntable, and means operative by the weight of the vehicle for moving said driving means into and out of operative position with said track.

18. A turntable comprising a track, driving means actuated by the wheels of a vehicle and engageable with the track for rotating the turntable, and means for moving said driving means into and out of operative position with said track.

19. A turntable operated by the wheels of a vehicle comprising a rotatable table, a track, and means for pivotally supporting said table upon said track.

20. A turntable having driving means actuated by the wheels of a vehicle for rotating the turntable, a track, and means for moving said driving means into and out of contact with said track.

21. A turntable having a rotatable table, means for rotating the table from either side, a base and means operative by the weight of the vehicle for bodily moving one end of said table relative to said base.

22. A turntable having a table rotatable by the wheels of a vehicle, a base and means operative by the weight of the vehicle for bodily moving one end of said table relative to said base.

23. A turntable comprising a rotatable platform, means for driving said platform from either of a plurality of points, said platform being tiltable to effect driving from either point.

24. A turntable comprising a rotatable platform, means for driving said platform from opposite sides, said platform being tiltable by the weight of a vehicle to drive the platform from either side.

25. A turntable comprising a tiltable platform, means for driving said platform from opposite sides, said driving means being automatically positioned for operation from that side upon which the vehicle enters by the tilting of the platform due to the weight of the vehicle.

26. A turntable comprising a rotatable platform, means for driving said platform from opposite sides, said platform being tiltable by the weight of a vehicle to drive the platform from either side.

27. A turntable comprising a tiltable platform, means for driving said platform from opposite sides, said driving means being automatically positioned for operation from that side upon which the vehicle enters by the tilting of the platform due to the weight of the vehicle.

28. A turntable provided with a stationary base, a load supporting member comprising tracks for receiving and revolving vehicles driven thereonto from either end, means connecting said load supporting member and said base, said means being revolvably mounted upon said base and said load supporting member being freely tiltable in any position relative to said base.

29. A turntable comprising a stationary base portion having rotatable tiltable tracks mounted thereon to support vehicles moved thereonto from either end and means operable by the power of the vehicle for revolving said tracks.

30. A turntable comprising a base provided with rotatable tiltable tracks to support and turn vehicles moved thereonto from either end of said tracks.

In testimony whereof, I hereby affix my signature in the presence of two witnesses.

OSCAR L. JONES.

Witnesses:
JAMES R. FLEMING,
HERBERT LONG.